(12) United States Patent
Tanno et al.

(10) Patent No.: US 7,549,452 B2
(45) Date of Patent: *Jun. 23, 2009

(54) PNEUMATIC TIRE

(75) Inventors: Atsushi Tanno, Hiratsuka (JP); Toshiyuki Ikeda, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 201 days.

This patent is subject to a terminal disclaimer.

(21) Appl. No.: 10/563,303

(22) PCT Filed: Aug. 3, 2004

(86) PCT No.: PCT/JP2004/011073

§ 371 (c)(1), (2), (4) Date: Jan. 4, 2006

(87) PCT Pub. No.: WO2005/012006

PCT Pub. Date: Feb. 10, 2005

(65) Prior Publication Data

US 2007/0119532 A1    May 31, 2007

(30) Foreign Application Priority Data

Aug. 4, 2003  (JP) .............. 2003-285823
Aug. 4, 2003  (JP) .............. 2003-285829

(51) Int. Cl.
*B60C 5/00* (2006.01)
*B60C 19/00* (2006.01)

(52) U.S. Cl. .................. 152/155; 152/156; 152/157; 152/158; 152/450

(58) Field of Classification Search .............. 152/155, 152/156, 165, 167, 169, 170, 171, 172, 173, 152/175, 176, 177, 180, 195, 196, 197, 198, 152/203, 205, 450, 157, 158

See application file for complete search history.

(56) References Cited

U.S. PATENT DOCUMENTS 1,269,388 A * 6/1918 Clydesdale ............ 152/205
1,733,681 A * 10/1929 Israel ..................... 152/205
4,265,660 A * 5/1981 Giflo ....................... 420/83
5,154,534 A * 10/1992 Guerin et al. ............ 404/70

(Continued)

FOREIGN PATENT DOCUMENTS

JP    62-216803    9/1987

(Continued)

OTHER PUBLICATIONS

International Search Report, Nov. 9, 2004.

*Primary Examiner*—Justin Fischer
(74) *Attorney, Agent, or Firm*—Greer, Burns & Crain, Ltd

(57) ABSTRACT

Disclosed is a pneumatic tire provided with an elastic fixing band having excellent durability and enabling stable attachment of a member, which is independent from the tire, to an inner surface of a tread thereof. The pneumatic tire of the present invention includes a member attached to an inner surface of a tread thereof by use of an elastic fixing band, the member being independent from the tire. The pneumatic tire is characterized in that the elastic fixing band is formed of a metallic band form with a width in a range of 10 to 40 mm and a thickness in a range of 0.1 to 0.5 mm.

3 Claims, 5 Drawing Sheets

U.S. PATENT DOCUMENTS 7,387,141 B2 * 6/2008 Tanno et al. ................ 152/155

FOREIGN PATENT DOCUMENTS

| JP | 09-086113 | 3/1997 |
| JP | 2000-062408 | 2/2000 |
| JP | 2002-028432 | 1/2002 |
| JP | 2002-195907 | 7/2002 |
| JP | 2003-226104 A | 8/2003 |
| JP | 2004-291855 | 10/2004 |
| RO | 115859 * | 7/2000 |

* cited by examiner

Inner surface of the tire

Inner surface of the tire

PNEUMATIC TIRE

TECHNICAL FIELD

The present invention relates to a pneumatic tire, and more specifically, relates to a pneumatic tire to which a member independent from the tire is attached to an inner surface of a tread thereof by use of a ring-like elastic fixing band.

BACKGROUND ART

Inside a tire, for example, attachment of a sound absorbing member for a noise reduction purpose, and attachment of a pressure sensor for a pneumatic-pressure controlling purpose, a temperature sensor and the like often take place.

Since these members are members independent from the tire, they often move around or drop off because of deformation of the tire, centrifugal force and the like when the tire is run. There has been a very difficult problem in attaching them in a stable state.

As a representative example for the abovementioned members, a sound absorbing member, which absorbs vibration sound of air inside a tire, is proposed to be attached to an inner surface of a tread thereof, because a sound absorption effect is good when it is attached thereto (refer to Patent Document 1, for example). However, in a case where the sound absorbing member is attached to an inner surface of the tire by use of a bond or the like, a member different from a tire is added inside the tire, and therefore, the sound absorbing member often falls off as a result of stress concentration to a bonding interface due to tire deformation when the tire rotates. There have been a lot of difficult problems in a method of attaching it.

On the other hand, as a countermeasure for the above issue, in a case of attaching a sound absorbing member, an applicant of this invention proposed to attach the sound absorbing member to an inner surface of a tread by utilizing an elasticity of an elastic fixing band formed of synthetic resin (Japanese patent application Tokugan No. 2002-28432). However, an elastic fixing band formed of synthetic resin has to be relatively large in thickness in order to obtain a desired elasticity (stiffness). The material formed in such a thickness has a problem that a fatigue life thereof is decreased, because stresses to surfaces thereof are increased with increasing thickness thereof when it receives bending deformation.

[Patent Document 1] Japanese patent application Tokkai No. Sho62-216803

DISCLOSURE OF THE INVENTION

An object of the present invention is to provide a pneumatic tire provided with an elastic fixing band having excellent durability and enabling stable attachment of a member, which is independent from the tire, to an inner surface of a tread thereof.

For the purpose of achieving the above object, the present invention is formed of any one of the following (1) to (9):

(1) A pneumatic tire having a member, which is independent from a tire, attached to an inner surface of a tread thereof by use of an elastic fixing band, where the elastic fixing band is formed of a metallic band form with a width in a range of 10 to 40 mm and a thickness in a range of 0.1 to 0.5 mm;

(2) The pneumatic tire according to abovementioned (1), where the band form is made of a metallic material having a tensile strength in a range of 400 to 1400 MPa;

(3) The pneumatic tire according to any one of abovementioned (1) and (2), where an outer periphery of the elastic fixing band is covered with rubber or synthetic resin;

(4) The pneumatic tire according to any one of abovementioned (1) to (3), where a circumferential length of the elastic fixing band is set being 10 to 50 mm shorter than a circumferential length of the center of an inner periphery of the tire;

(5) The pneumatic tire according to any one of abovementioned (1) to (4), where the member is a sound absorbing member formed of a porous material:

(6) The pneumatic tire according to any one of abovementioned (1) to (5), where a circumferential length of the elastic fixing band is a fixed length;

(7) The pneumatic tire according to any one of abovementioned (1) to (5), which includes a stretching mechanism at least in one location on a circumference of the elastic fixing band, the stretching mechanism automatically adjusting a circumferential length of the elastic fixing band;

(8) The pneumatic tire according to abovementioned (7), where the stretching mechanism is formed of an elastic spring mechanism; and (9) The pneumatic tire according to abovementioned (7), where the stretching mechanism is formed by coupling both ends of the elastic fixing band with each other in a manner that the elastic fixing band can slide.

According to the abovementioned pneumatic tire of the present invention, by forming an elastic fixing band, which is used for attaching a member to an inner surface of a tread, of metal, it becomes possible to make a thickness of the elastic fixing band to be as extremely thin as 0.1 to 0.5 mm. Thereby, even when the elastic fixing band repeatedly suffers bending deformation when the tire rotates, it can reduce stresses to inside and outside surfaces thereof, and hence prolongs a fatigue life thereof. Consequently, durability of the elastic fixing band is enhanced.

DESCRIPTION OF SYMBOLS

Figure 1:
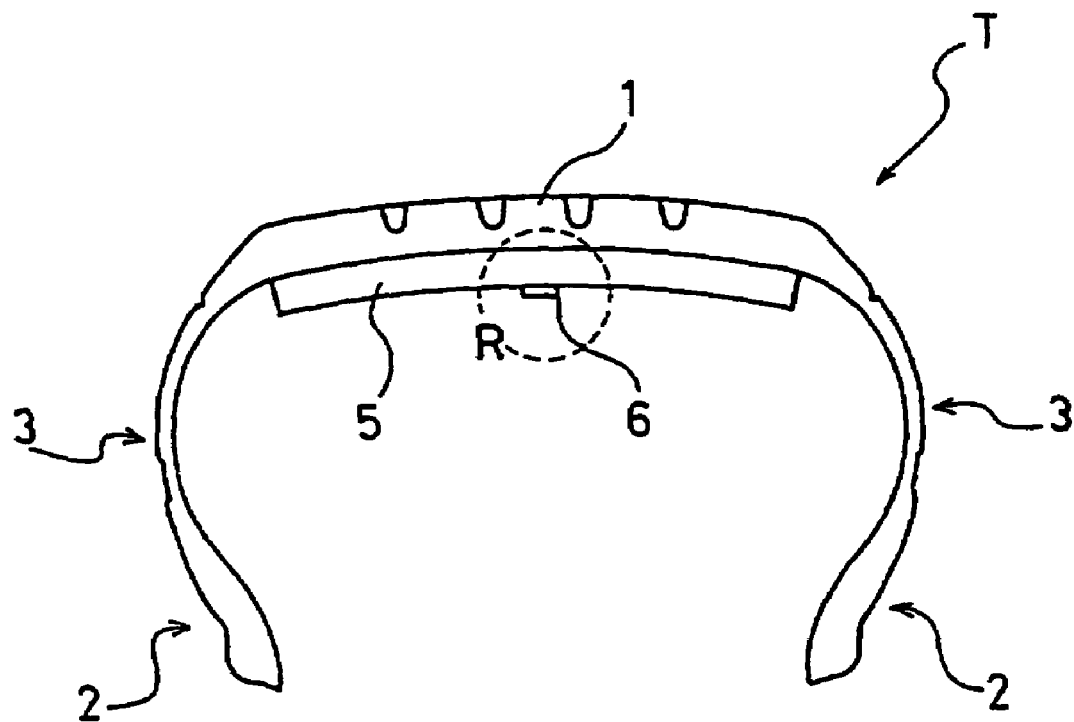
FIG. 1 is a cross-sectional view taken along a meridian of the tire, showing an example of a pneumatic tire as an embodiment of the present invention.

1: tread portion
2: bead portion
3: sidewall portion
5: sound absorbing member
6: elastic fixing band
7a, 7b and 7c: plate spring
7: coupling jig
G: ground surface
Q: ground-contacting portion
T: tire
t: thickness of elastic fixing band
W: width of elastic fixing band

BEST MODE FOR CARRYING OUT THE INVENTION

Hereinafter, detailed descriptions will be given of configurations of the present invention with reference to the attached drawings. The same numerals and characters are attached to components common among any ones of the drawings thereof, so that duplicated descriptions are omitted.

Figure 2:
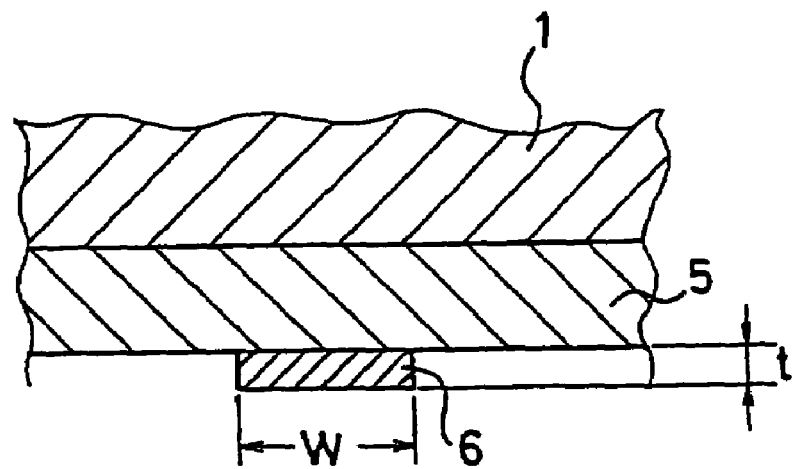
FIG. 2 is an enlarged cross-sectional view showing a portion in FIG. 1 enclosed by R.

FIG. 1 is a cross-sectional view showing as an example of an embodiment in a case where, in a pneumatic tire according to the present invention, a sound absorbing member as an independent member, which is formed of a porous material, is attached to an inner surface of a tread of the tire. FIG. 2 is an enlarged cross-sectional view showing a part in FIG. 1 enclosed by R, and is a side view for explaining a main portion (a portion enclosed by R) in FIG. 1.

In FIG. 1, a pneumatic tire T includes: a tread portion 1; a pair of left and right bead portions 2; a sidewall portion coupling the tread portion 1 to the bead portions 2. To an inner surface of the tread portion 1, a sound absorbing member 5 is attached as an independent member from the tire by use of an elastic fixing band 6 of metal.

Both ends of the elastic fixing band 6 in a longitudinal direction thereof are coupled with each other, and a ring-like band is formed thereby. Although means for coupling the both ends is not particularly limited, the both ends may be overlapped on each other to be sealed by use of a binding machine, a sealing machine or the like, or may be coupled by a pair of fastening bands. Means for joining the elastic fixing band 6 and the sound absorbing member 5 is not particularly limited, and the joint may be performed by use of a bond, or may be preformed by use of such coupling means as a bolt, in accordance with a kind and a configuration of the sound absorbing member 5.

In the present invention, the elastic fixing band 6 is meant to be formed of a band form made of a thin metallic material and to have an elasticity generated by its whole structure, and is formed to have a width W in a range preferably of 10 to 40 mm, and more preferably of 15 to 30 mm, and to have a thickness in a range preferably of 0.1 to 0.5 mm, and more preferably of 0.1 to 0.2 mm. As the metallic material, one having a characteristic that tensile strength is in a range of 400 to 1400 MPa is preferable, and in particular, stainless steel or shape-memory alloy is preferable.

With such a configuration, while the elasticity of the elastic fixing band 6 allows the sound absorbing member 5 to be attached by pressure to an inner surface of the tread portion in an invariably stable manner, the elastic fixing band 6 can minimize stresses received by its surfaces when the tire rotates, and can prolong its fatigue life.

Figure 3A:
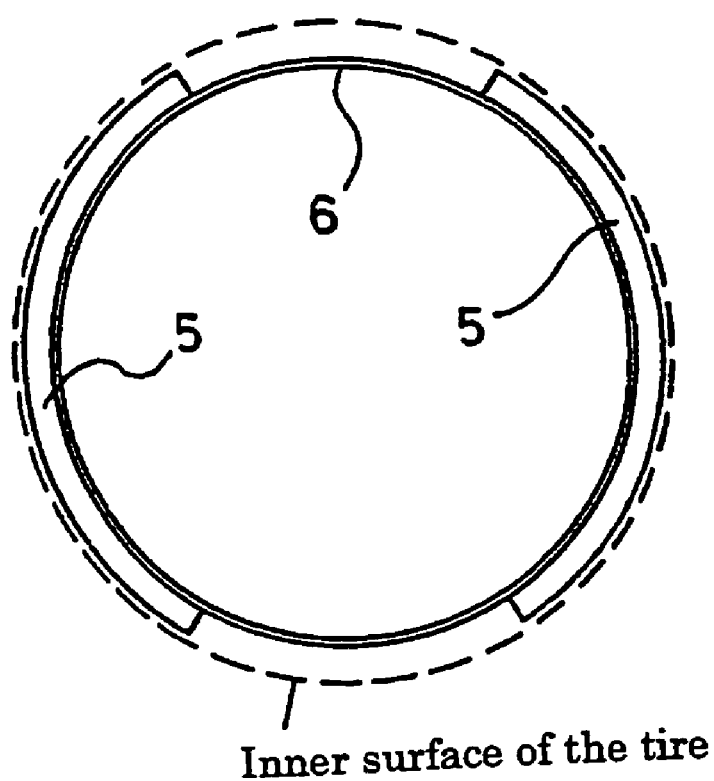
FIG. 3a is a side view for explaining one example of an arrangement relation in a case where a member is attached by use of an elastic fixing band, as one embodiment of the invention.

A positional relation in a radial direction of the tire between the sound absorbing member 5 and the elastic fixing band 6 is not particularly limited. The positional relation may be, as shown in FIG. 3a, a relation where the sound absorbing member 5 is arranged in a manner that by the elastic fixing band 6, the sound absorbing member 5 is attached by pressure from the inside of the tire to the inner surface. Otherwise, it may be, as shown in FIG. 3b, a relation where the elastic fixing band 6 is arranged outside the sound absorbing member 5, or may be a relation where the elastic fixing band 6 penetrates a center of the sound absorbing member 5 in a thickness-wise direction thereof.

Figure 3B:
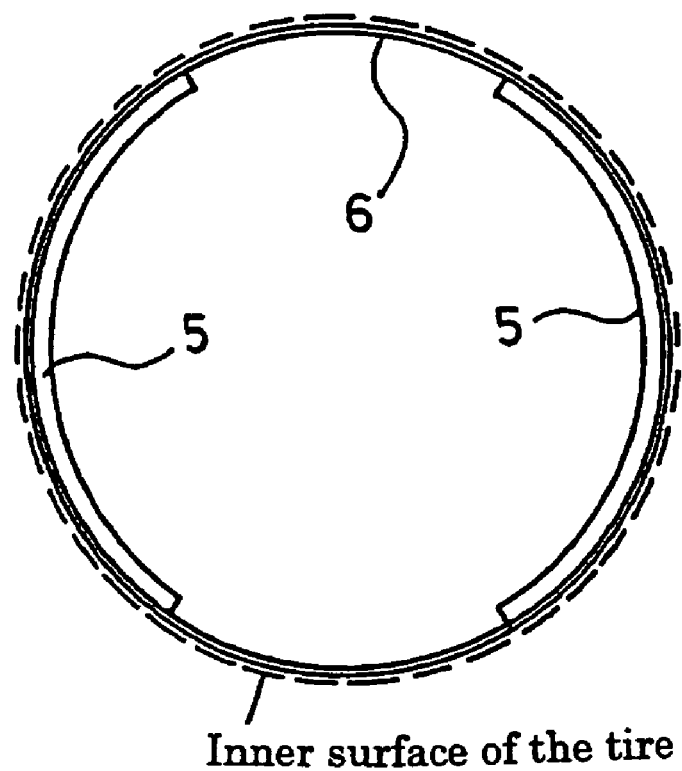
FIG. 3b is a side view for explaining one other example of an arrangement relation in a case where a member is attached by use of an elastic fixing band, as one other embodiment of the invention.

In the case where the elastic fixing band 6 is arranged to directly contact the inner surface of the tire as shown in FIG. 3b, for the purpose of preventing the metallic elastic fixing band 6 from damaging the tire surface, an outer peripheral surface of the elastic fixing band 6 may be covered with rubber or synthetic resin, the outer peripheral surface facing the inner surface of the tire.

Additionally, in the case where the elastic fixing band 6 is arranged as shown in FIG. 3a as well, for the purpose of preventing damages to the sound absorbing member 5, the outer peripheral surface of the elastic fixing band 6 may be covered with rubber or synthetic resin. An effect of the damage prevention is further exerted if the rubber or the synthetic resin is formed of foam.

Figure 4:
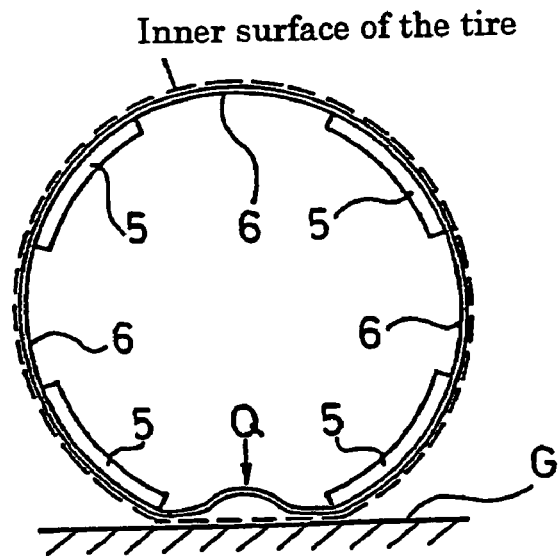
FIG. 4 is a side view for explaining a buckling phenomenon of a tire.
Figure 5:
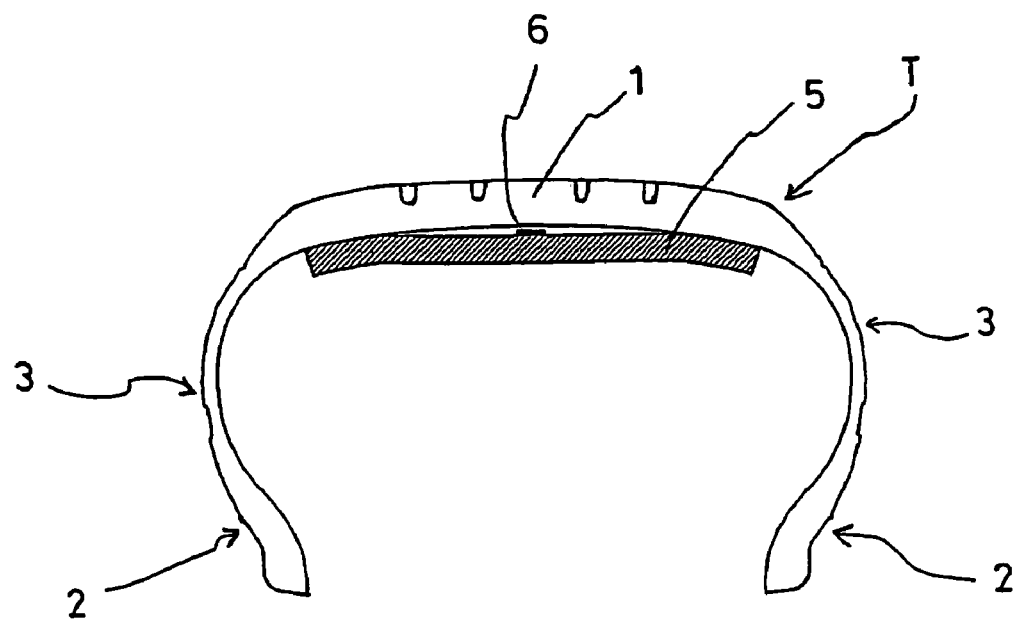
FIG. 5 is a schematic cross-sectional view taken along a meridian of the tire, for schematically showing a state where the pneumatic tire is not installed to an automobile when a circumferential length of an elastic fixing band 6 is set being 10 to 50 mm shorter than that of an inner periphery of a tread portion 1, and the view showing a state where the elastic fixing band and an inner surface of the tread portion 1 are out of contact with each other.

Furthermore, in the present invention, in a case where a circumferential length of the elastic fixing band 6 is set fixed, as shown in FIG. 4, a buckling phenomenon occurs in some occasions in a ground-contacting portion Q where the tire contacts a ground surface G. Because of this buckling phenomenon, in some occasions, retention of the sound absorbing member 5 becomes unstable, or the inner surface of the tire is damaged. In order to prevent this phenomenon, it is preferable that the circumferential length of the elastic fixing band be 10 to 50 mm shorter than a circumferential length of an inner periphery of the tread portion 1.

Such a configuration is particularly effective in the case as shown in FIG. 3b where a structure is such that the elastic fixing band 6 is arranged outside the sound absorbing member 5 and comes into contact with the inner surface of the tread portion 1. When the circumferential length of the elastic fixing band is set being 10 to 50 mm shorter than the circumferential length of an inner periphery of the tread portion 1, there is brought about a state where the elastic fixing band and the inner surface of the tread portion 1 do not come into contact with each other, however this state is brought about only when the pneumatic tire is not mounted on an automobile, and. arises no problem. That is, when the pneumatic tire is mounted on an automobile, the pneumatic tire partially deflates due to a weight of the automobile and the circumferential length of the inner periphery of the tread portion 1 becomes slightly shorter, whereby the elastic fixing band 6 comes into contact with the inner surface of the tread portion 1 and thus an ideal state of the attachment can be realized.

Note that, although the abovementioned descriptions have been given to the case where the elastic fixing band 6 has its circumferential length fixed, in the present invention, it is also possible to adopt a structure where the circumferential length of the elastic fixing band 6 is not fixed and can be changed.

That is, by particularly setting the circumferential length of the elastic fixing band 6 variable and adjusting a circumferential length of the sound absorbing member 5, it becomes possible to apply the common sound absorbing member 5 and elastic fixing band 6 to various kinds of pneumatic tires. Furthermore, it becomes possible to delicately adjust the circumferential length of the elastic fixing band 6, and thus the sound absorbing member 5 and the elastic fixing band 6 can be attached all around the entire circumference on the inner surface of the tread portion 1 of the tire T in a more appropriate state. Thereby, the sound absorbing member 5 and the elastic fixing band 6 cannot be an obstacle against workability at the time of tire-rim assembly.

For the purpose of particularly setting the circumferential length of the elastic fixing band 6 variable and adjusting a circumferential length of the sound absorbing member 5, it is desirable to use the elastic fixing band provided with a stretching mechanism, which automatically adjusts a circumferential length of the elastic fixing band, at least in one location on a circumference of the elastic fixing band.

Figure 6:
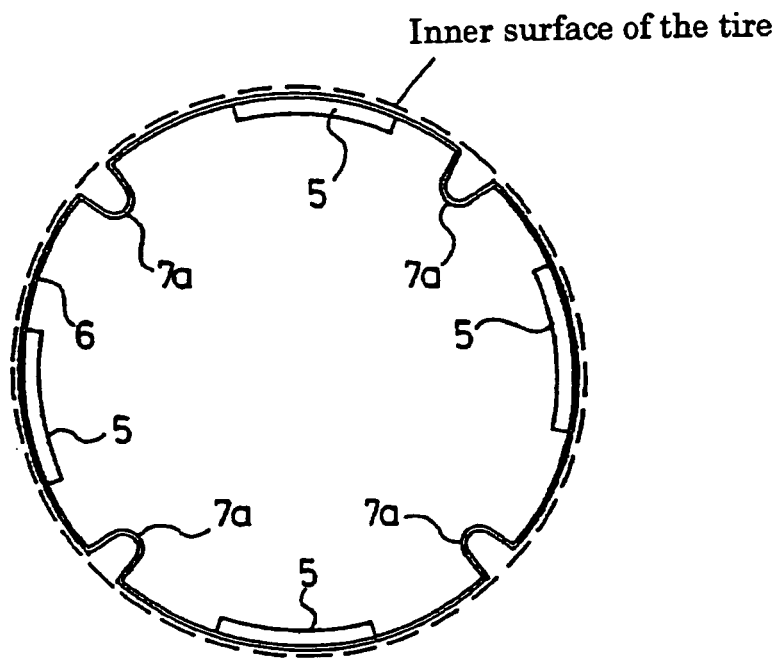
FIG. 6 is a side view showing an example of one aspect of a pneumatic tire according to the invention, the pneumatic tire using an elastic fixing band provided, in at least one location on the circumference of the elastic fixing band, with a stretching mechanism which automatically adjusts a circumferential length of the elastic fixing band.

In an illustration of an example of one aspect of the elastic fixing band by way of FIG. 6, the elastic fixing band 6 is formed of a metallic band form having the abovementioned width and thickness according to the invention. Additionally, the circumferential length thereof is cut off in at least one location (four locations in the illustration) and ends thereof facing an space thus cut off are coupled with each other by a plate spring 7a which is bent in a U-shape. A portion corresponding to this U-shaped plate spring 7a is meant to work as a stretching mechanism which automatically absorbs a component in the circumferential direction of a load applied to the elastic fixing band 6. In an example of the pneumatic tire configured with this aspect in FIG. 6, the elastic fixing band 6 is arranged to the outer periphery of the sound absorbing member 5 as shown in FIG. 3b.

Figure 7A:
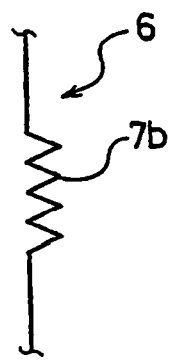
FIG. 7a is a schematic view showing another example of the stretching mechanism used in the elastic fixing band in the one aspect shown in FIG. 6 according to the invention.
Figure 7B:
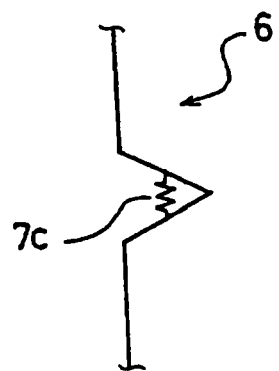
FIG. 7b is a schematic view showing yet another example of the stretching mechanism used in the elastic fixing band in the one aspect shown in FIG. 6 according to the invention.

As this kind of a stretching mechanism formed of the plate spring 7a, a plate spring 7b or 7c which is bent in a zig-zag manner as shown in FIG. 7a or 7b as an example may be used. Note that, although the number of the stretching mechanisms formed on the circumference of the elastic fixing band 6 is not particularly limited, the stretching mechanisms may be evenly arranged in three to eight locations on the circumference.

As described above, in a tire where the elastic fixing band 6 is provided with the stretching mechanism 7a, 7b or 7c, even when an external force which may generate a buckling phenomenon or the like acts upon the elastic fixing band 6, the stretching mechanism automatically absorbs the external force. Consequently, a life of the elastic fixing band 6 can be prolonged, and additionally, attachment of the sound absorbing member 5 to the inner surface of the tread can be stabilized.

Figure 8:
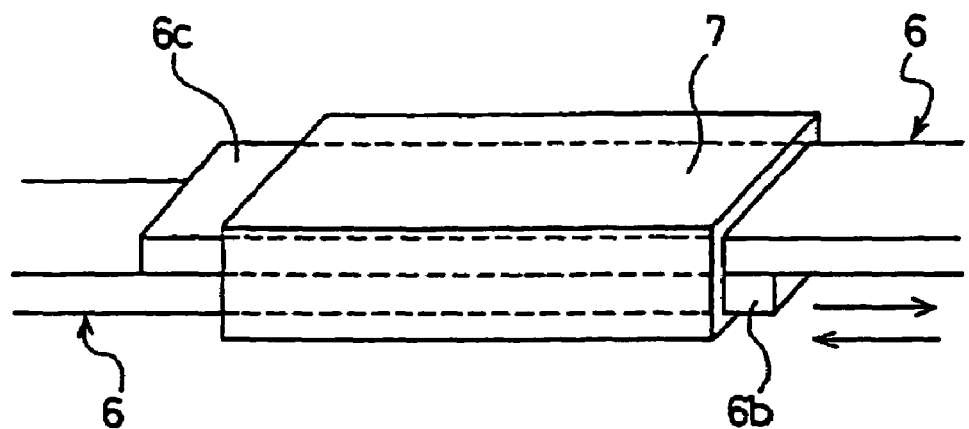
FIG. 8 is a schematic view showing still another example of the stretching mechanism used in the elastic fixing band in the one aspect shown in FIG. 6 according to the invention.

FIG. 8 shows still another example of the stretching mechanism. Both ends 6b and 6c of the elastic fixing band 6 in a lengthwise direction thereof are coupled with each other by use of a coupling jig 7 in a manner that the elastic fixing band 6 can slide. That is, while one end 6b of the elastic fixing band 6 is fixed to the coupling jig 7, the other end 6c thereof is allowed to freely slide. For the purpose of securing a smooth slide of the end 6c of the elastic fixing band 6 and/or a sliding surface of the coupling jig 7 may be covered with fluorine resin or may be coated with lubricant oil.

By configuring a tire in the abovementioned manner, the elastic fixing band 6 automatically absorbs the external force which may generate a buckling phenomenon or the like, whereby a fatigue life of the elastic fixing band 6 can be prolonged, and stable attachment of the band-shaped sound absorbing member 5 to the inner surface of the tread becomes possible. In other words, although this buckling has conventionally brought about such problems that attachment of the band-shaped sound absorbing member 5 becomes unstable, and that a fatigue life of the elastic fixing band 6 is shortened, such problems can be reduced if the tire has the above elastic fixing band provided with the stretching mechanism which automatically adjusts the circumferential length of the elastic fixing band.

In describing the abovementioned embodiment, the sound absorbing member 5 formed of a porous material has been taken as an example for a member which is be attached to the inside of a tire and is independent from the tire. However, this member may be any one which can be attached to (accommodated in) the inside of a tire, and is not particularly limited to a sound absorbing member. The member may be a pneumatic pressure sensor provided for a pneumatic-pressure controlling purpose, a temperature sensor or the like.

INDUSTRIAL APPLICABILITY

The pneumatic tire of the present invention can be utilized in the tire industry, and by extension can be effectively utilized in the automobile industry.

What is claimed is:

1. A pneumatic tire comprising:
   a member attached to an inner surface of a tread thereof by use of an elastic fixing band, the member being independent from the tire; and
   a stretching mechanism at least in one location on a circumference of the elastic fixing band, the stretching mechanism automatically adjusting a circumferential length of the elastic fixing band;
   wherein the elastic fixing band is formed of a metallic band form with a width in a range of 10 to 40 mm and a thickness in a range of 0.1 to 0.5 mm, and the member is a sound absorbing member formed of a porous material.

2. The pneumatic tire according to claim 1, wherein the stretching mechanism is formed of an elastic spring mechanism.

3. The pneumatic tire according to claim 1, wherein the stretching mechanism is formed by coupling both ends of the elastic fixing band with each other in a manner that the elastic fixing band can slide.

* * * * *